United States Patent
Du et al.

(10) Patent No.: US 7,880,352 B2
(45) Date of Patent: Feb. 1, 2011

(54) SPRING SHEET-TYPE VIBRATION MOTOR

(75) Inventors: Sunbin Du, Dongyang (CN); Jianping Zhou, Dongyang (CN)

(73) Assignee: Chengji Electro-Mechanics Co., Ltd., Dongyang (CN)

( * ) Notice: Subject to any disclaimer, the term of this patent is extended or adjusted under 35 U.S.C. 154(b) by 52 days.

(21) Appl. No.: 12/535,984

(22) Filed: Aug. 5, 2009

(65) Prior Publication Data

US 2010/0045127 A1    Feb. 25, 2010

(30) Foreign Application Priority Data

Aug. 25, 2008    (CN) .......................... 200810120391

(51) Int. Cl.
H02K 7/65    (2006.01)
H02K 7/06    (2006.01)

(52) U.S. Cl. .......................................... 310/81; 310/71

(58) Field of Classification Search ................... 310/71, 310/81; 439/862, 66
See application file for complete search history.

(56) References Cited

U.S. PATENT DOCUMENTS

| | | | |
|---|---|---|---|
| 6,740,999 B1 | 5/2004 | Segawa | |
| 6,872,104 B2 * | 3/2005 | Sun | 439/862 |
| 6,954,015 B2 | 10/2005 | Segawa | |
| 7,129,607 B2 * | 10/2006 | Segawa | 310/81 |
| 2006/0284501 A1 * | 12/2006 | Takagi et al. | 310/81 |

* cited by examiner

*Primary Examiner*—Quyen Leung
*Assistant Examiner*—Leda Pham
(74) *Attorney, Agent, or Firm*—Connolly Bove Lodge & Hutz LLP

(57) ABSTRACT

A spring-sheet-type vibration motor comprises a motor body with an output shaft on a front end and an end cap coupled between a supporting bracket and the motor body on the rear end. The end cap supports one or more electric brushes against the motor body. The supporting bracket includes an end face and a prolonged portion extending therefrom toward the front end of the motor body. One or more connecting terminals are coupled to the supporting bracket, with a first portion coupled to the end face and a front end of a second portion coupled to the prolonged portion. Each terminal further includes a third portion extending obliquely away from the front end of the second portion, a fourth portion bending upward from an end of the third portion, and a contact disposed on a lower surface of a connecting area of the third portion and the fourth portion.

10 Claims, 3 Drawing Sheets

SPRING SHEET-TYPE VIBRATION MOTOR

BACKGROUND OF THE INVENTION

1. Priority

Priority is claimed as under 35 U.S.C. §119 to Chinese patent application No. CN200810120391.5, filed Aug. 25, 2008. The disclosure of this priority application is incorporated herein by reference in its entirety.

2. Field of the Invention

The field of the present invention is vibration motors, and in particular spring-sheet-type vibration motors.

3. Background

A motor in the background art is provided in KR100533590B1. The motor comprises: an output shaft projecting from a front end of a motor body, a power supplying terminal electrically coupled to the motor body, a contact of the terminal is disposed near a rear of the motor body, the terminal has an elastic force in a direction generally perpendicular to the output shaft; the terminal is formed by bending an elastic material and comprises: a first portion extending substantially parallel to the output shaft from the motor body; a second portion curving from the front end of the first portion; a third portion, formed a contact, projecting outward in a curve manner from the rear end of the second portion. The terminal is only mounted on the rear end of the motor body, while the first portion, the second portion and the third portion of the terminal are away from the motor body and in a free state. In cases where the motor is assembled into other instruments, it is easy for the contact of the third portion to move and detach from its predetermined electric contact on the circuit board so that a bad electric connection occurs.

Another motor disclosed in JP2007-336617A comprises: a motor body, an output shaft projecting from a front end of the motor body, an end cap being disposed near a rear of the motor body, a terminal supporting portion extending from the lower end of the end cap towards the front end of the motor body; the motor has two power supplying terminals, each terminal is composed of two individual parts which are a first portion and a second portion, the first portion comprises a radial-direction section fixed to the end cap and an axial-direction section extending from the lower end of the radial-direction section towards the front end of the motor body, the second portion is fixed to the axial-direction section of the first portion with a rivet, the second portion comprises a middle section slanting and extending downwards the rear end of the motor body and a free end formed by curving upwards the lower end of the middle section. Since the terminal is composed of two individual parts, the number of the components increases, whereby it is inconvenient to manufacture and assemble them.

SUMMARY OF THE INVENTION

The present invention is directed toward a spring-sheet-typed vibration motor, wherein the contact of the terminal will not be detached from the predetermined electric contact on the circuit board when being assembled so that an excellent electric connection can be obtained. At the same time, when such a spring-sheet-typed vibration motor is employed, an integrated structure of the terminal can be assured and the parts need not be added.

The spring-sheet-typed vibration motor may be summarized as follows; a motor comprises: a motor body, an output shaft projecting from a front end of the motor body, an end cap being disposed near a rear of the motor body, one or more electric brushes being disposed in the inner side of the end cap, a supporting bracket mounted on the said end cap, the supporting bracket comprises an end face portion secured to the end cap and a prolonged portion extending from the lower end of the end face portion towards the front end of the motor body; the said motor also comprises: one or more connecting terminals supplying power for the motor body, each terminal is formed integrally and comprises: a first portion attached to the end face portion of the supporting bracket; a second portion extending from the lower end of the first portion towards the front end of the motor body, the second portion comprises an axial prolonged section and a front end section, wherein the front end section is secured to the prolonged portion of the supporting bracket; a third portion obliquely and downwards extending from a rear end of the front end section of the second portion towards the rear end of the motor body; a fourth portion formed by curving upwards from the lower end of the third portion, a contact is disposed on the lower surface of the connecting area of the third portion and the fourth portion; the axial prolonged section of the second portion and the third portion appear stagger arrangement, the width of the front end section of the said second portion equals to the sum of the width of the axial prolonged section of the second portion and the width of the third portion.

The third portion of the terminal may be is formed by extending away from the front end section of the second portion so that the front end section of the second portion can be mounted on the prolonged portion of the supporting bracket. By introducing the technical means that the first portion is fixed to the end face portion of the supporting bracket and the front end section of the second portion is inserted to the prolonged portion of the supporting bracket under the motor body, the swing around of the third portion of the terminal when being assembled can be prevented, thereby the contact can aims at the electric contact on the circuit board and no deviation happens, an excellent electric connection can be achieved. At the same time, the axial prolonged section of the second portion and the third portion of the terminal are arranged in a staggered state, whereby the second portion cannot counterwork the ascending movement of the third portion so that the third portion has a large space to deform elastically, the contact can connect reliably with the electric contact on the circuit board; in addition, a larger width of the front end section of the second portion can be achieved by the stagger arrangement of the axial prolonged section of the second portion and the third portion, whereby the front end section of the second portion can be inserted reliably in the prolonged portion of the supporting bracket.

Preferably, a slot corresponding to the front end section of the second portion of the terminal is formed in the prolonged portion of the supporting bracket, and the said front end section of the second portion of the terminal is inserted in the said slot. Wherein, the front end section of the second portion of the terminal cooperates with the slot in the prolonged portion of the supporting bracket can make the assembly more convenient, on the other hand, it can ensure the reliable installation.

Preferably, the said electric brush comprises a brush bracket and a brush piece fixed to the brush bracket with a rivet, a through-hole traversing from the outer side to the inner side of the end cap, the brush bracket is inserted in the through-hole from the inner side to the outer side, an end portion of the brush bracket extending to the outer surface of the end face portion of the supporting bracket, a protruding pole formed on the end face portion of the supporting bracket; a prolate hole cooperating with the outer end portion of the brush bracket and a round hole cooperating with the protruding pole are formed in the first portion of the said terminal.

Wherein, terminal is fixed by the prolate hole cooperating with the end portion of the brush bracket and oriented by the round hole cooperating with the protruding pole on the end face portion of the supporting bracket, and the brush bracket is fixed to the prolate hole with solder, thereby the terminal can be mounted reliably and no deviation can be caused so that the contact of the terminal can connect with the electric contact on the circuit board well when the terminal is assembled.

Preferably, a barb is formed on the side of the brush bracket, the said barb slants from the outer end to the inner end of the brush bracket. Wherein, the barb on the brush bracket can provide the reliable cooperation of the brush bracket and the end cap and prevent the brush bracket from disengaging from the through-hole of the end cap accordingly ensures the stable electric connection between the terminal and the brush piece.

Preferably, the second portion of the terminal is jointed against the lower surface of the prolonged portion of the supporting bracket, so the terminal can be secured reliably as a whole.

Consequently, the vibration motor described herein has a characteristic that the contact of the terminal does not move away from the electric contact on the circuit board thereby provides excellent electric connection.

Accordingly, an improved spring-sheet-type vibration motor is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

A detailed description of the preferred embodiment will now be described with reference to the accompanying drawings.

Figure 1:
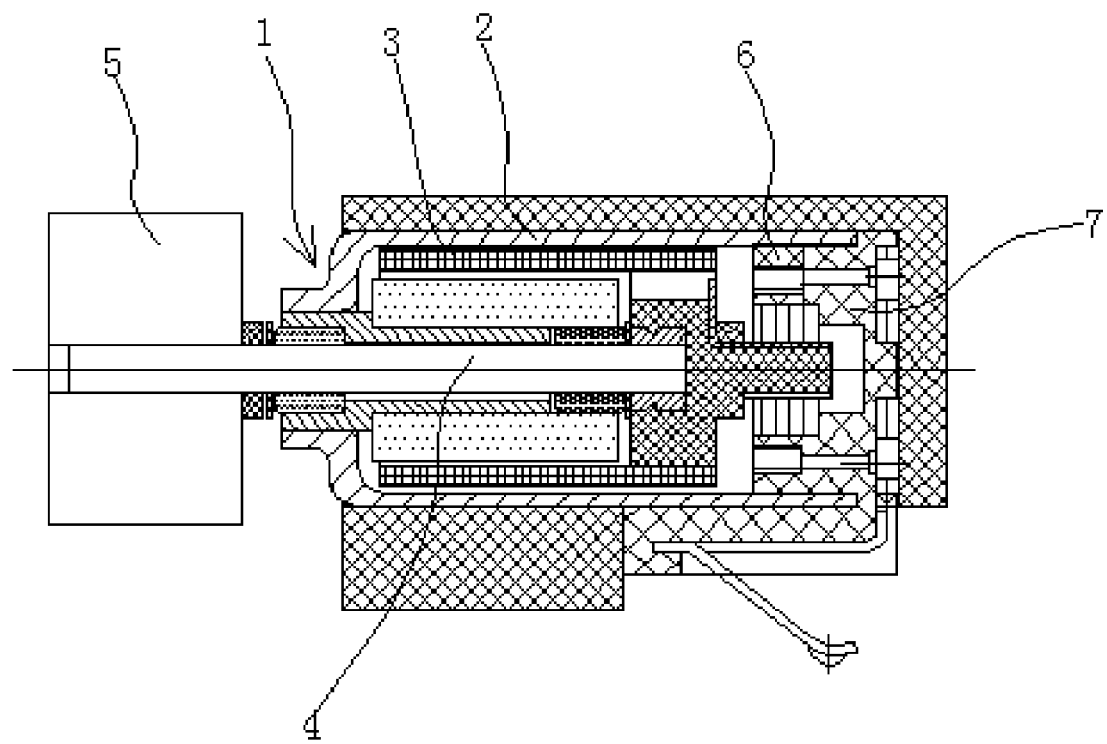
FIG. 1 is a construction view of the motor.

Embodiment 1: as shown in FIG. 1, a motor body 1 includes the stator 2 and the rotor 3 disposed in the stator 2, an output shaft 4 is secured to the center of the rotor 3 and extends from the front end of the stator 2, a weight 5 is attached to the protruding end of the output shaft, an end cap 6 is disposed on the rear end of the stator 2, a supporting bracket 7 is mounted to the outer side of the end cap 6.

Figures 6, 7:
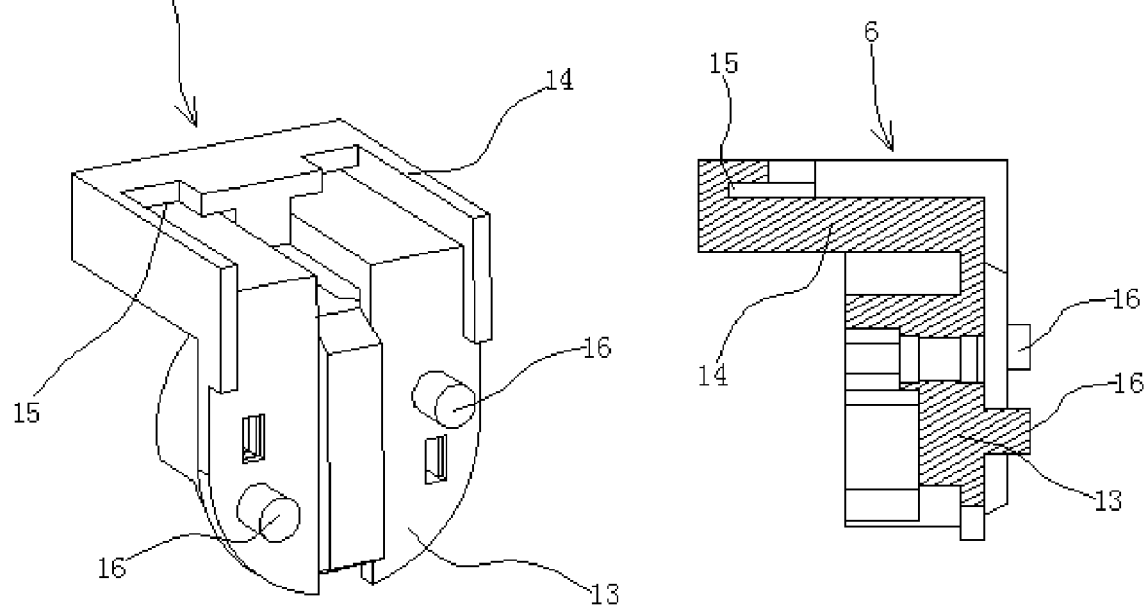
FIG. 6 is a solid construction view of the supporting bracket.
FIG. 7 is a plan construction view of the supporting bracket.

As shown in FIG. 6 and FIG. 7, the supporting bracket 7 comprises a end face portion 13 secured to the end cap 6 and a prolonged portion 14 extending from the lower end of the end face portion 13 towards the front end of the motor body, two slots 15 formed in the prolonged portion 14, two protruding poles 16 formed on the end face portion 13.

Figure 2:
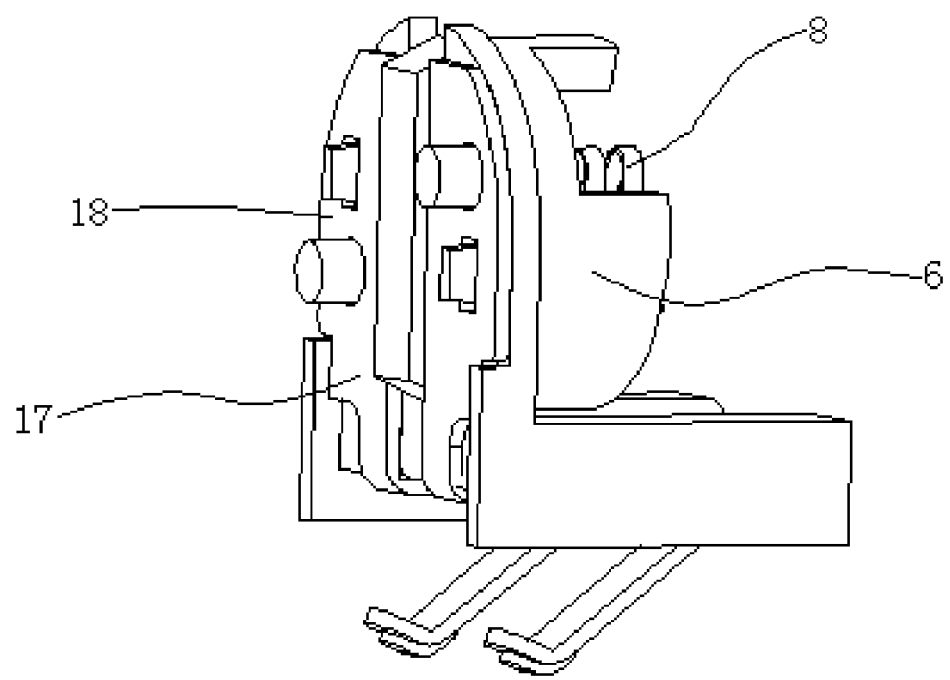
FIG. 2 is an assembly construction view of the supporting bracket, the terminal, the end cap and the electric brush.
Figure 3:
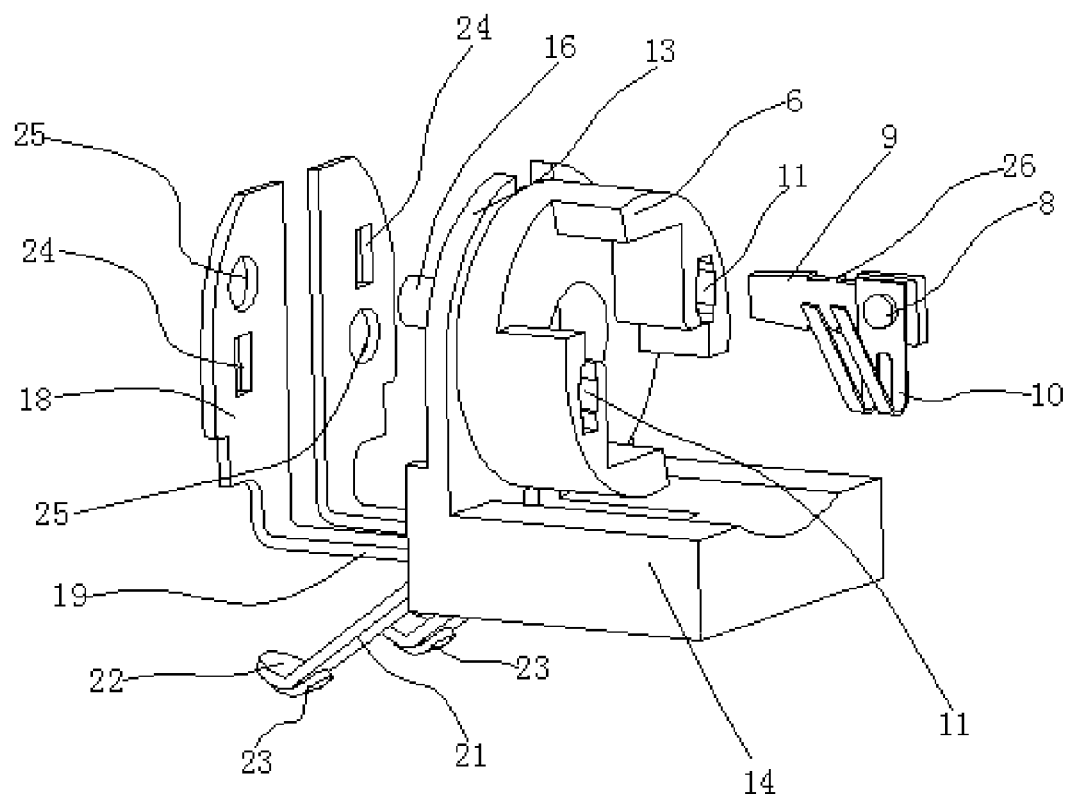
FIG. 3 is an exploded construction view of the supporting bracket, the terminal, the end cap and the electric brush.
Figure 4:
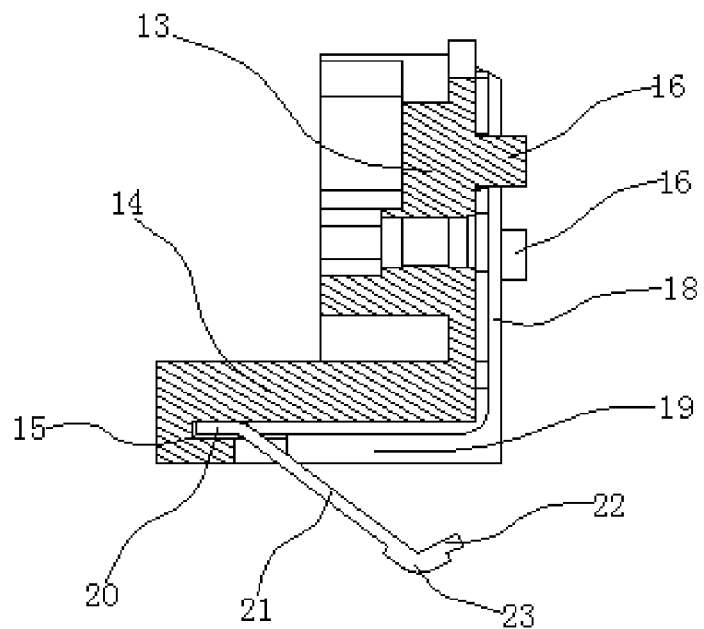
FIG. 4 is an assembly construction view of the supporting bracket and the terminal.
Figure 5:
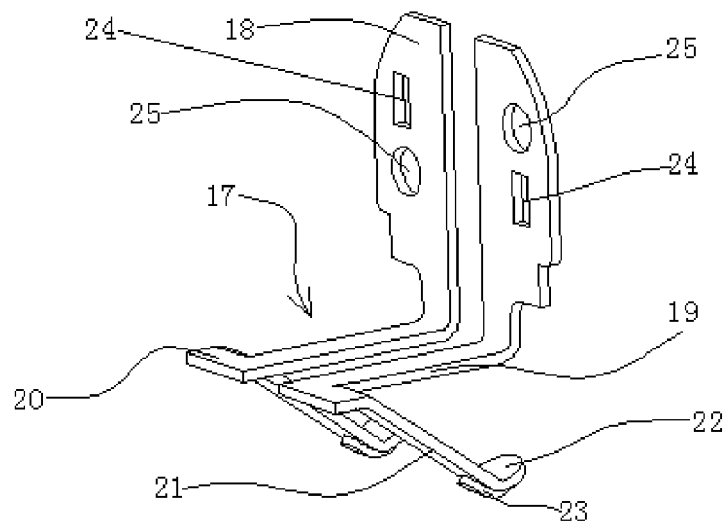
FIG. 5 is a construction view of two terminals.

As shown in FIG. 2, FIG. 3 and FIG. 4, an electric brush is disposed in the inner side of the end cap 6, the electric brush 8 comprises the brush bracket 9 and the brush piece 10 mounted on the brush bracket 9 with rivet, a barb 26 formed on the side of the brush bracket 9 and slanting from the outer end to the inner end of the brush bracket 9; the through-holes 11 traversing from the outer side to the inner side of the end cap 6, the brush bracket 9 inserting in the through-hole 11 from the inner end to the outer end and the end portion 12 of the brush bracket 9 extending to the outer surface of the end face portion 13 of the supporting bracket 7.

As shown in FIG. 2, FIG. 3, FIG. 4 and FIG. 5, the motor comprises two integrated terminals 17 supplying power for the motor body, each terminal 17 comprises: the first portion 18 mounted on the end face portion 13 of the supporting bracket 7, the prolate hole 24 in the first portion 18 assembled with the outer end of the brush bracket 9 and the round hole 25 in the first portion 18 assembled with the protruding pole 16 formed on the end face portion 13 of the supporting bracket 7, separately, wherein the outer end of the brush bracket 9 is mounted to the prolate hole 24 by solder; the second portion extending from the lower end of the first portion 18 towards the front end of the stator 2, the second portion comprises the axial prolonged portion 19 and the front end section 20, wherein the front end section 20 inserted in the slot 15 in the prolonged portion 14 of the supporting bracket 7, the axial prolonged portion 19 of the second portion is jointed against the lower surface of the prolonged portion 14 of the supporting bracket 7, the third portion 21 obliquely and downwards extending from a rear end of the front end section 20 of the second portion towards the rear end of the stator 2, the axial prolonged portion 19 of the second portion has a stagger location to the third portion 21, the width of the front end section 20 of the said second portion equals to the sum of the width of the axial prolonged portion 19 of the second portion and the width of the third portion 21; the fourth portion 22 is formed by curving upwards the lower end of the third portion 21, and the contact 23 is disposed on the lower surface of the connecting area of the third portion 21 and the fourth portion 22.

Thus, a spring-sheet-type vibration motor is/are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A spring-sheet-type vibration motor comprising:
a motor body;
an output shaft projecting from a front end of the motor body;
an end cap disposed on a rear end of the motor body;
one or more electric brushes disposed in an inner side of the end cap;
a supporting bracket having an end face portion secured to the end cap and a prolonged portion extending from a lower end of the end face portion toward the front end of the motor body;
one or more connecting terminals supplying power for the motor body, each terminal including:
a first portion secured to the end face portion of the supporting bracket;
a second portion extending from a lower end of the first portion toward the front end of the motor body and including an axial prolonged section and a front end section, wherein the front end section is mounted in the prolonged portion of the supporting bracket;

a third portion extending obliquely and downward from a rear end of the front end section of the second portion toward the rear end of the motor body, wherein the axial prolonged section of the second portion is arranged to be staggered with the third portion, the width of the front end section of the second portion is the sum of width of the axial prolonged section of the second portion and the width of the third portion;

a fourth portion bending upward from a lower end of the third portion; and a contact disposed on a lower surface of a connecting area of the third portion and the fourth portion.

2. The motor of claim 1, wherein the prolonged portion of the supporting bracket includes a slot, and the front end section of the second portion of the terminal is inserted into the slot.

3. The motor of claim 2, wherein each electric brush includes a brush bracket and a brush piece fixed to the brush bracket with a rivet, and the brush bracket is inserted into a through-hole extending through the end cap and the supporting bracket such that an end of the brush bracket extends to an outer surface of the end face portion of the supporting bracket.

4. The motor of claim 1, wherein each electric brush includes a brush bracket and a brush piece fixed to the brush bracket with a rivet, and the brush bracket is inserted into a through-hole extending through the end cap and the supporting bracket such that an end of the brush bracket extends to an outer surface of the end face portion of the supporting bracket.

5. The motor of claim 4, wherein the end face portion of the supporting bracket includes a protruding pole, and the first portion of each terminal includes a prolate hole cooperating with an outer end of the brush bracket and a round hole cooperating with the protruding pole.

6. The motor of claim 4, wherein the brush bracket includes a barb extending and slanting from an outer end of the brush bracket to an inner end of the brush bracket.

7. The motor of claim 6, wherein said barb is formed on a side of the brush bracket.

8. The motor of claim 1, wherein the second portion of each terminal is jointed against a lower surface of the prolonged portion of the supporting bracket.

9. The motor of claim 1, wherein the number of said connecting terminals is two.

10. The motor of claim 1, wherein each connecting terminal is formed integrally.

* * * * *

UNITED STATES PATENT AND TRADEMARK OFFICE
CERTIFICATE OF CORRECTION

PATENT NO. : 7,880,352 B2  
APPLICATION NO. : 12/535984  
DATED : February 1, 2011  
INVENTOR(S) : Sunbin Du et al.

Page 1 of 1

It is certified that error appears in the above-identified patent and that said Letters Patent is hereby corrected as shown below:

On the title page,

Item (30) Foreign Application Priority Data should read --Aug. 25, 2008 (CN) 200810120391.5--, not "200810120391."

Signed and Sealed this
Nineteenth Day of April, 2011

David J. Kappos
*Director of the United States Patent and Trademark Office*